(12) United States Patent
Sugino et al.

(10) Patent No.: US 7,933,684 B2
(45) Date of Patent: Apr. 26, 2011

(54) AUTONOMOUS MOBILE ROBOT

(75) Inventors: Tsukasa Sugino, Saitama (JP); Takashi Nakayama, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1265 days.

(21) Appl. No.: 11/302,231

(22) Filed: Dec. 14, 2005

(65) Prior Publication Data

US 2006/0217838 A1   Sep. 28, 2006

(30) Foreign Application Priority Data

Dec. 14, 2004 (JP) .................. 2004-361255
Dec. 2, 2005 (JP) .................. 2005-348984

(51) Int. Cl.
*G06F 19/00* (2011.01)
*G05B 15/00* (2006.01)
*G05B 19/00* (2006.01)
*H04R 3/00* (2006.01)

(52) U.S. Cl. .......... 700/245; 700/259; 700/262; 381/92; 169/52

(58) Field of Classification Search .................. 700/259, 700/245, 56, 248, 262; 381/92; 169/52
See application file for complete search history.

(56) References Cited

U.S. PATENT DOCUMENTS

| | | | |
|---|---|---|---|
| 6,604,021 B2 * | 8/2003 | Imai et al. ................ | 700/245 |
| 7,182,144 B2 * | 2/2007 | Baba et al. ................ | 169/52 |
| 7,346,428 B1 * | 3/2008 | Huffman et al. .......... | 700/245 |
| 2002/0120364 A1 * | 8/2002 | Colens ..................... | 700/262 |
| 2004/0193323 A1 * | 9/2004 | Higaki et al. ............ | 700/259 |
| 2004/0230340 A1 * | 11/2004 | Fukuchi et al. .......... | 700/245 |
| 2005/0137748 A1 * | 6/2005 | Kim ......................... | 700/245 |
| 2005/0195989 A1 * | 9/2005 | Sato et al. ................. | 381/92 |
| 2006/0047361 A1 * | 3/2006 | Sato et al. ................. | 700/245 |
| 2006/0173577 A1 | 8/2006 | Takeda et al. | |
| 2006/0184274 A1 * | 8/2006 | Sakai et al. .............. | 700/245 |
| 2006/0185858 A1 * | 8/2006 | Baba et al. ............... | 169/52 |
| 2006/0293787 A1 * | 12/2006 | Kanda et al. ............. | 700/245 |

FOREIGN PATENT DOCUMENTS

| | | |
|---|---|---|
| JP | 11058271 A | 3/1999 |
| JP | 11202937 A | 7/1999 |
| JP | 2000326274 A | 11/2000 |
| JP | 2002144278 A | 5/2002 |
| JP | 2002-202815 A | 7/2002 |
| JP | 2004042151 A | 2/2004 |
| JP | 2004133846 A | 4/2004 |
| JP | 2004230480 A | 8/2004 |
| JP | 2004298976 A | 10/2004 |
| WO | 2004052597 A1 | 6/2004 |

\* cited by examiner

*Primary Examiner* — Khoi Tran
*Assistant Examiner* — Ian Jen
(74) *Attorney, Agent, or Firm* — Squire, Sanders & Dempsey (US) LLP

(57) ABSTRACT

An autonomous mobile robot is provided which is autonomously movable, including an upper body, legs connected under the upper body, a first detector which detects an object in a front region of the upper body in a moving direction of the robot, and a second detector which detects an object in a region other than a sensing region sensed by the first detector including at least a rear region, a rear right region, and a rear left region of the upper body.

15 Claims, 11 Drawing Sheets

AUTONOMOUS MOBILE ROBOT

CROSS REFERENCE TO RELATED APPLICATIONS

This application claims the foreign priority benefit under Title 35, United States Code, §119(a)-(d) of Japanese Patent Applications No. 2004-361255, filed on Dec. 14, 2004 and No. 2005-348984, filed on Dec. 2, 2005 in the Japan Patent Office, the disclosure of which is herein incorporated by reference in its entirety.

BACKGROUND OF THE INVENTION

1. Field of the Invention

The present invention relates to an autonomous mobile robot, and more specifically, to an autonomous mobile robot which can autonomously move with legs connected under an upper body.

2. Description of the Related Art

An autonomous mobile robot includes an obstacle detector to detect an obstacle to avoid the obstacle or the like. For instance, an autonomous mobile device is disclosed in JP 2002-202815A, which includes, as obstacle detectors, a scanning sensor (such as a laser radar) for detecting position of an obstacle by scanning a horizontal plane in a front region and a non-scanning obstacle sensor (such as an ultrasonic sensor and an infrared sensor) for detecting an obstacle within a space other than where the scanning sensor can scan. The autonomous mobile device usually detects an obstacle in the front region with the scanning sensor (such as a laser radar) and operates the non-scanning obstacle sensor (such as an ultrasonic sensor and an infrared sensor) only when an obstacle is detected by the scanning sensor.

Accordingly, the autonomous mobile device can estimate the position of the obstacle with the both sensors so as to allow efficient detection and movement to avoid an obstacle.

By the way, the autonomous mobile device disclosed in JP 2002-202815A can detect an obstacle or the like in a front region with the scanning sensor and the non-scanning obstacle sensor, but cannot detect an obstacle in a rear region of the autonomous mobile device other than the front region of the autonomous mobile device.

Thus, for instance, the autonomous mobile device cannot detect an obstacle just behind the autonomous mobile device. Consequently, on moving backward, the autonomous mobile device cannot move properly in response to an obstacle in the rear region of the autonomous mobile device in spite of being able to move backward. Moreover, the autonomous mobile device cannot recognize an object (for instance, a man) approaching from the rear.

SUMMARY OF THE INVENTION

Therefore, it is an object of the present invention to provide an autonomous mobile robot which can certainly detect an obstacle even in a rear region.

In an aspect of the present invention, there is provided an autonomous mobile robot which is autonomously movable. The autonomous mobile robot includes an upper body, legs connected under the upper body, a first detector which detects an object in a front region of the upper body in a moving direction of the robot, and a second detector which detects an object in a region other than a sensing region sensed by the first detector including at least a rear region, a rear right region, and a rear left region of the upper body.

According to the aspect of the present invention, the first detector can detect an object in the front region of the upper body. Additionally, the second detector can detect an object in the rear region, the rear right region, and the rear left region of the upper body.

In another aspect of the present invention, in the autonomous mobile robot, the first detector may include a stereo camera and the second detector may include an ultrasonic sensor.

According to the aspect of the present invention, the stereo camera can detect an object in the front region of the upper body. In addition, the ultrasonic sensor can detect an object in the rear region, the rear right region, and the rear left region of the upper body.

In a further aspect of the present invention, in the autonomous mobile robot, a plurality of ultrasonic sensors may be arranged along periphery of the upper body from rear portions of right and left sides of the upper body to a backside of the upper body keeping a predetermined space between adjacent ones of the plurality of ultrasonic sensors.

According to the aspect of the present invention, the plurality of ultrasonic sensors can detect an object in a rear region of a backside of the upper body.

Additionally, in an aspect of the present invention, in the autonomous mobile robot, the upper body may be rotatable relative to the legs about a vertical axis.

According to the aspect of the present invention, the upper body may rotate relative to the legs about the vertical axis so that even a little number of ultrasonic sensors can detect a wide range of region.

Additionally, in another aspect of the present invention, in the autonomous mobile robot, the upper body may include a body unit which is rotatable relative to the legs about a vertical axis, and a head which is rotatable relative to the body unit about a vertical axis. Moreover, the plurality of ultrasonic sensors may be provided in the body unit, and the stereo camera may be provided in the head.

According to the aspect of the present invention, the head rotates relative to the body unit about the vertical axis so as to cause the sensing region of the stereo camera to turn in a desired direction.

Moreover, the body unit rotates relative to the legs about the vertical axis and the head rotates relative to the body unit about the vertical axis so as to cause the sensing regions of the stereo cameras and the ultrasonic sensors to turn in a desired direction.

Additionally, in a further aspect of the present invention, the autonomous mobile robot may include a second ultrasonic sensor which is provided in the body unit to detect an object in the front region of the body unit in the moving direction of the robot.

According to the aspect of the present invention, the second ultrasonic sensor can detect an object in the front region of the body unit. Therefore, even when the head rotates and the stereo camera turns in a direction other than forward, the second ultrasonic sensor can detect an object in the front region.

Moreover in an aspect of the present invention, the autonomous mobile robot may include a pair of arms provided on right and left sides of the body unit, a pair of hands respectively provided at ends of the pair of arms, and an arm controller which drives the pair of arms and the pair of hands. In the autonomous mobile robot, the arm controller may control the pair of arms and the pair of hands to swing within a region outside sensing regions of the plurality of ultrasonic sensors and the second ultrasonic sensor when the robot moves forward and backward with the legs.

According to the aspect of the present invention, the plurality of ultrasonic sensors and the second ultrasonic sensor can detect an object without being obstructed by movement of the arms and the hands.

Moreover in another aspect of the present invention, in the autonomous mobile robot, when at least one of the pair of arms and the pair of hands is positioned in at least one of the sensing regions of the plurality of ultrasonic sensors and the second ultrasonic sensor, at least one of the plurality of ultrasonic sensors and the second ultrasonic sensor corresponding to the at least one of the sensing regions in which the at least one of the pair of arms and the hands is positioned, may stop detecting an object.

According to the aspect of the present invention, when one of the plurality of ultrasonic sensors and the second ultrasonic sensor cannot detect an object by being obstructed by the arm or the hand, the ultrasonic sensor can stop detecting an object so as to reduce load of processing data.

Moreover, in a further aspect of the present invention, in the autonomous mobile robot, the legs may be movable right and left. Additionally, the stereo camera, the plurality of ultrasonic sensors, and the second ultrasonic sensor may detect an object when the robot moves forward and backward with the legs. Moreover, the head may rotate relative to the body unit so as to cause the stereo camera to detect an object in the moving direction when the robot moves right and left with the legs.

According to the aspect of the present invention, on moving forward and backward, the stereo cameras and the second ultrasonic sensors detect an object in the front region, and a plurality of ultrasonic sensors detect an object in the rear region of the upper body. Moreover, on moving right and left, the stereo camera detects an object in a moving direction. Meanwhile, on moving right and left, the plurality of ultrasonic sensors and the second ultrasonic sensor may detect an object or stop detecting an object. Therefore, it is possible to detect an object in response to movement of the robot.

Furthermore, in an aspect of the present invention, the autonomous mobile robot may include a controller which, when a sensing region of the stereo camera is overlapped with at least one of the sensing regions of the plurality of ultrasonic sensors and the second ultrasonic sensor, recognizes that an object which is in the overlapped sensing region, and not detected by the stereo camera but detected by one of the plurality of ultrasonic sensors and the second ultrasonic sensor corresponding to the at least one of the sensing regions with which the sensing region of the stereo camera is overlapped, is transparent.

According to the aspect of the present invention, it is possible to recognize ambient environment more precisely using difference between results detected by the stereo cameras and results detected by one of the plurality of ultrasonic sensors and the second ultrasonic sensor.

Furthermore, in another aspect of the present invention, the autonomous mobile robot may include a pair of arms provided on right and left sides of the body unit, and a pair of hands respectively provided at ends of the pair of arms. In the autonomous mobile robot, when at least one of the pair of arms and the pair of hands is positioned in at least one of the sensing regions of the plurality of ultrasonic sensors and the second ultrasonic sensor, at least one of the plurality of ultrasonic sensors and the second ultrasonic sensor corresponding to the at least one of sensing regions in which the at least one of the pair of arms and the hands is positioned, may stop detecting an object.

According to the aspect of the present invention, when one of the plurality of ultrasonic sensors and the second ultrasonic sensor cannot detect an object by being obstructed by the arm or the hand, the ultrasonic sensor can stop detecting an object so as to reduce load of processing data.

According to the present invention, the first detector can detect an object in the front region of the upper body. Additionally, the second detector can detect an object in the rear region, the rear right region, and the rear left region of the upper body. Therefore, an object (an obstacle or a mobile object) around the autonomous mobile robot can be certainly detected.

According to the present invention, the stereo camera can certainly detect an obstacle which is an object in the front region of the upper body. In addition, the ultrasonic sensor can certainly detect an obstacle such as a glass window which is an object in the rear region of the backside of the upper body.

According to the present invention, an obstacle such as a glass window or a man which is an object in the rear region of the backside of the upper body can be certainly detected.

According to the present invention, the upper body may rotate relative to the legs about the vertical axis so that even a little number of ultrasonic sensors can detect a wide range of region, resulting in low cost.

According to the present invention, even when the head rotates and the stereo cameras turn in a direction other than forward, the second ultrasonic sensor can detect an object in the front region.

According to the present invention, when one of the plurality of ultrasonic sensors and the second ultrasonic sensor cannot detect an object by being obstructed by the arm or the hand, the ultrasonic sensor can stop detecting an object so as to reduce data processing.

According to the present invention, it is possible to detect an object in response to movement of the robot.

According to the present invention, it is possible to recognize ambient environment more precisely using difference between results detected by the stereo cameras and results detected by one of the plurality of ultrasonic sensors and the second ultrasonic sensor.

Figure 9A:
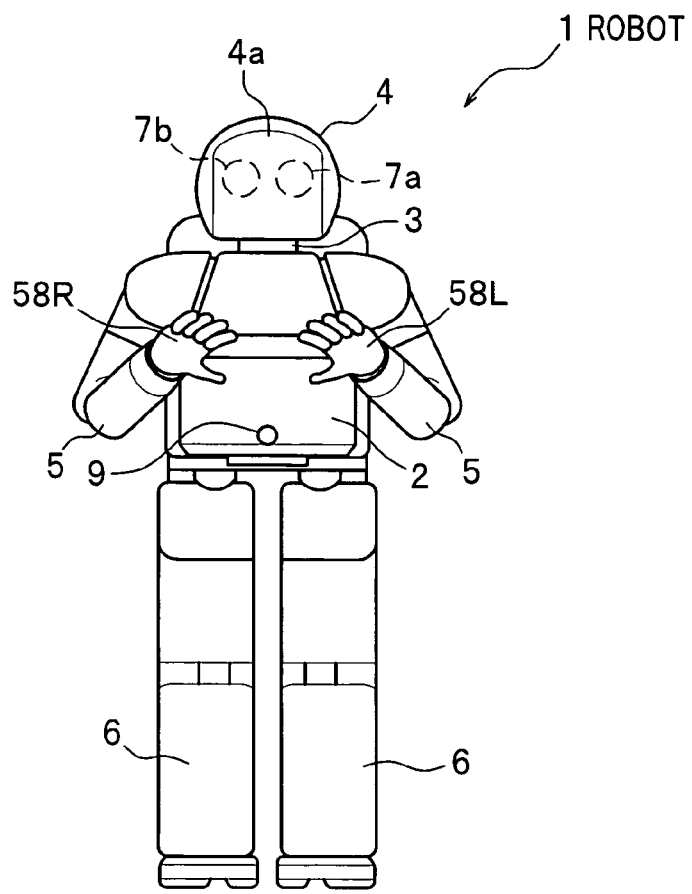

The FIG. 9A is a front view of an example of the robot which is gesturing.

Figure 9B:
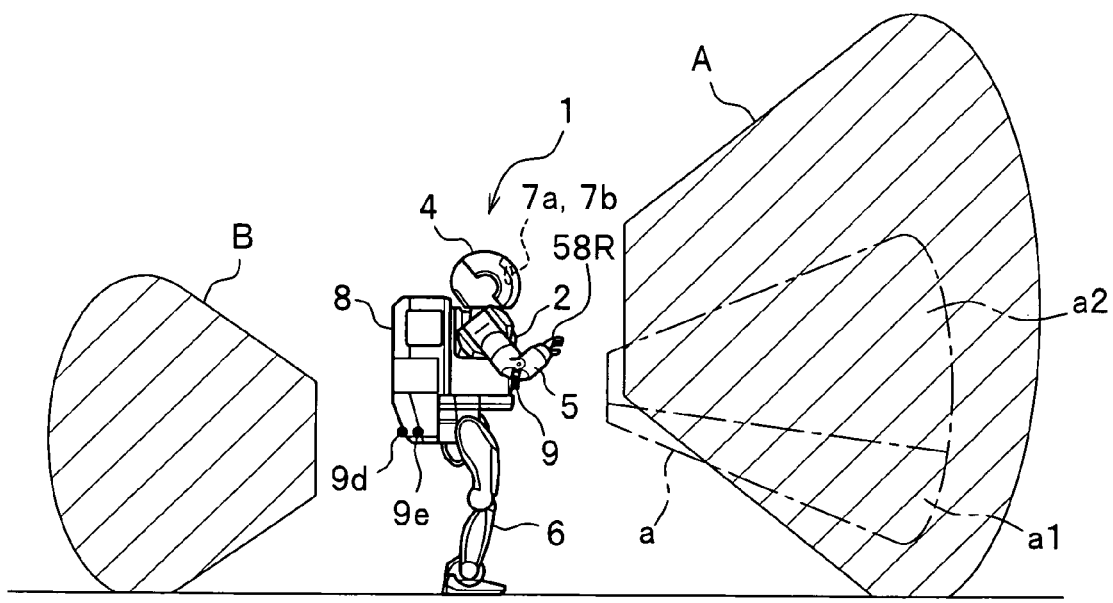

The FIG. 9B is a side view of an example of the robot which is gesturing.

Figure 10A:
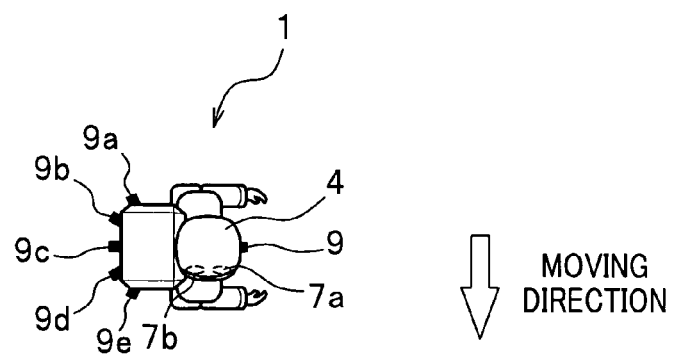
Figure 10A:
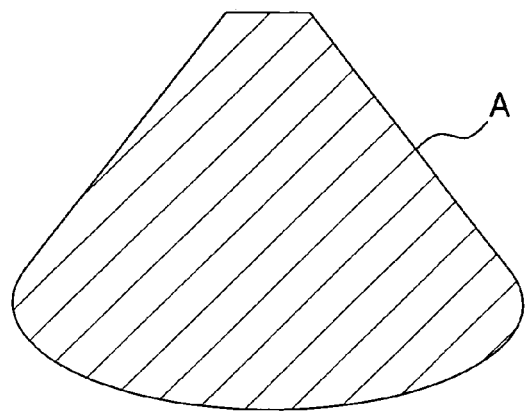

FIG. 10A is a top plan view showing detection of an object when the robot moves to the right.

Figure 10B:
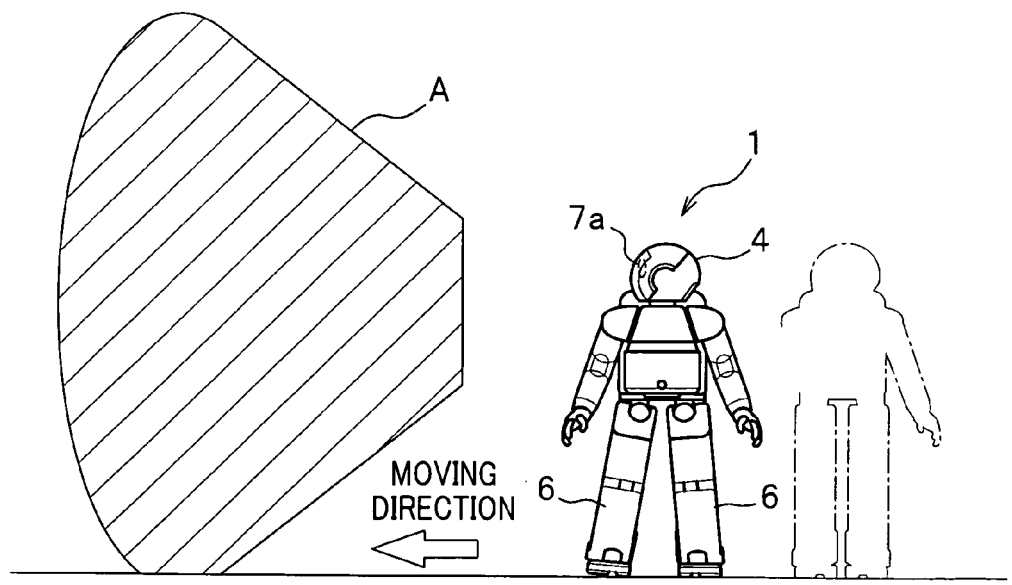

FIG. 10B is a front view showing detection of an object when the robot moves to the right.

Figure 11A:
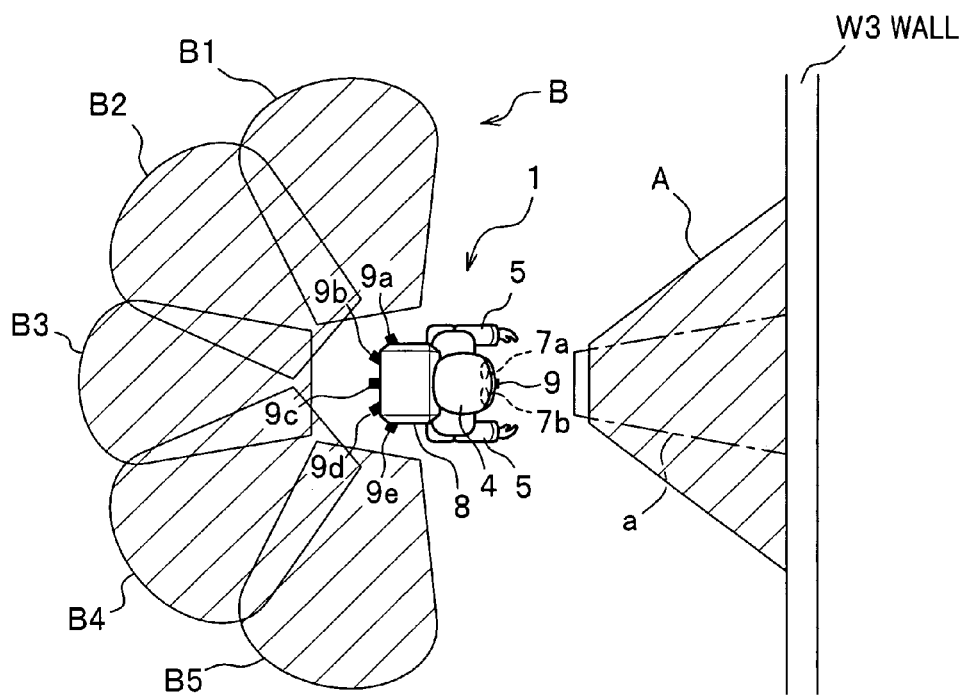

FIG. 11A is a top plan view showing a state where there is an object (a wall) in a shooting range of CCD cameras and a sensing range of an ultrasonic sensor which are arranged on a frontside of the robot.

Figure 11B:
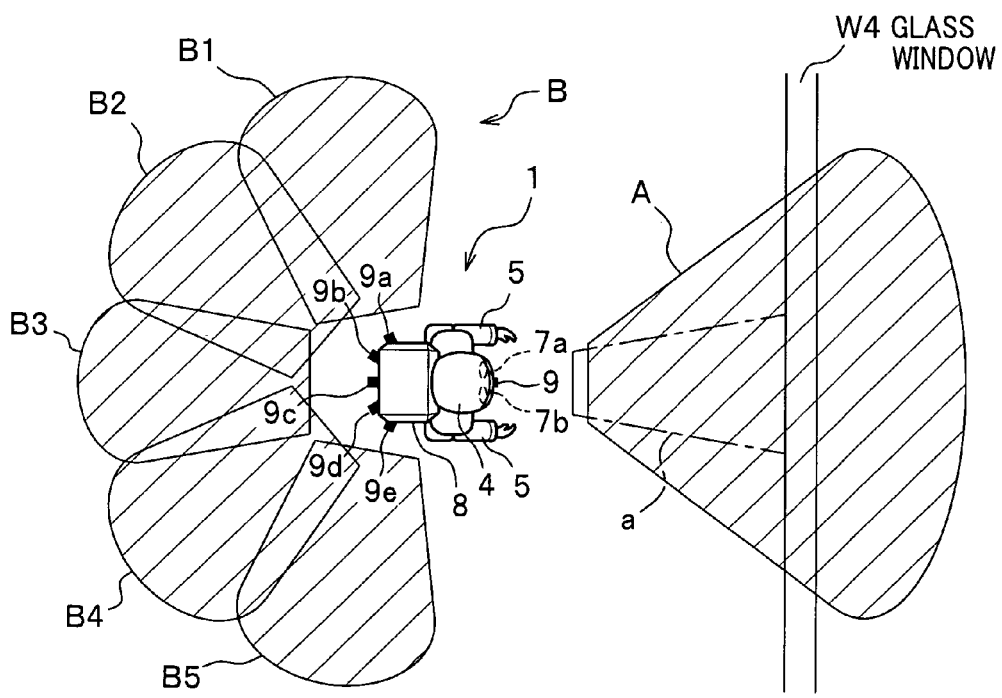

FIG. 11B is a top plan view showing a state where there is an object (a glass window) in a shooting range of CCD cameras and a sensing range of an ultrasonic sensor which are arranged on a frontside of the robot.

DESCRIPTION OF THE PREFERRED EMBODIMENTS

Figure 1:
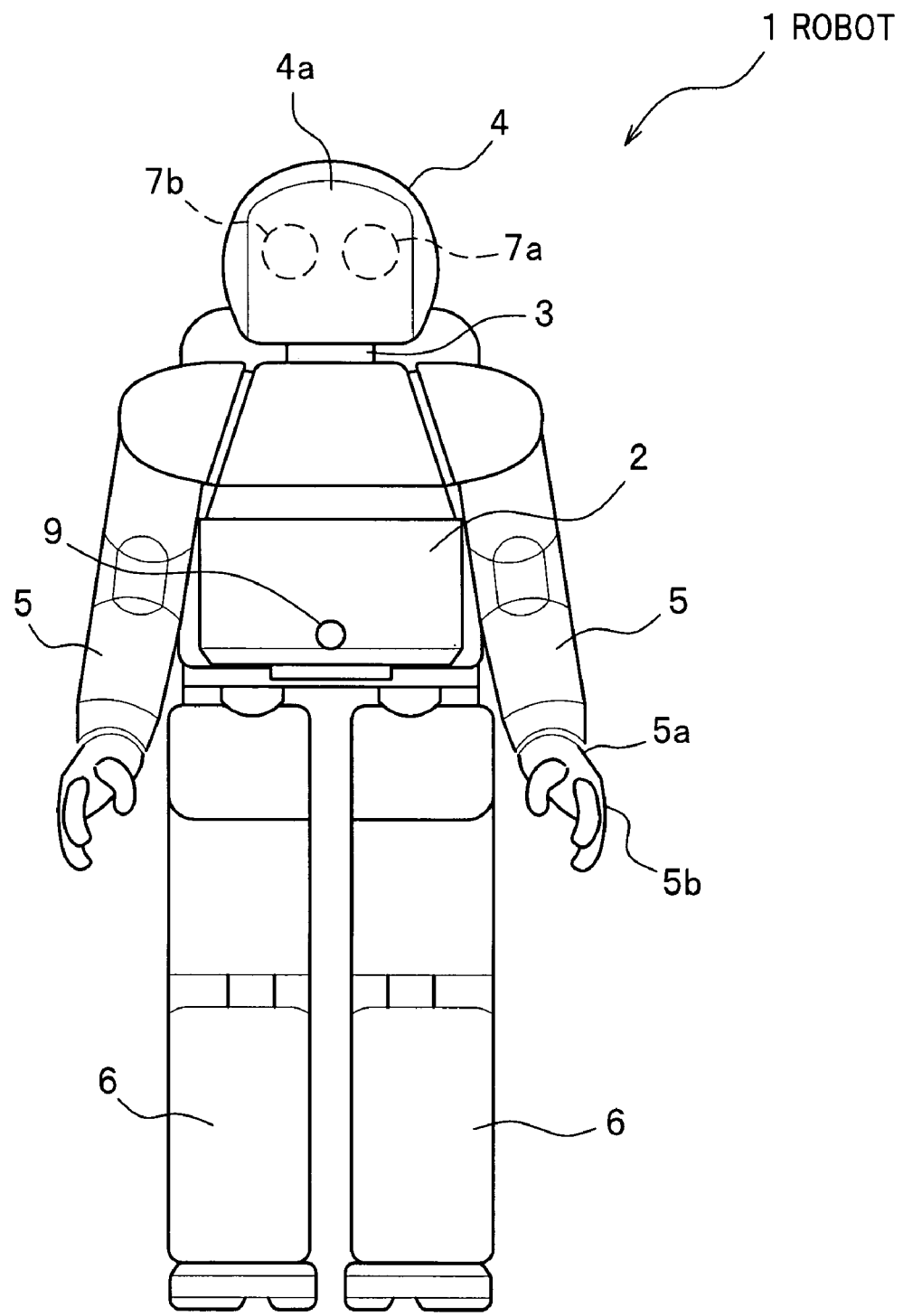
FIG. 1 is a front view showing a robot according to an embodiment of the present invention.
Figure 2A:
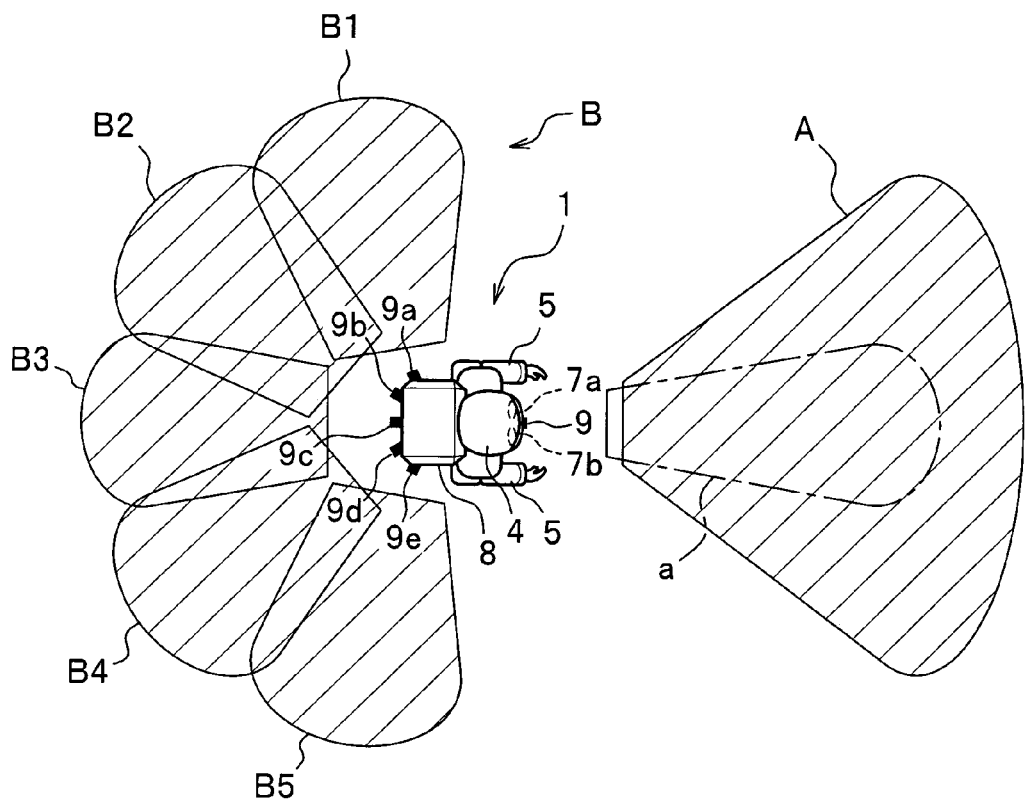
FIG. 2A is a top plan view showing a shooting range of two CCD cameras provided on a frontside of the robot and sensing ranges of five ultrasonic sensors provided on a backside of the robot according to the present embodiment.
Figure 2B:
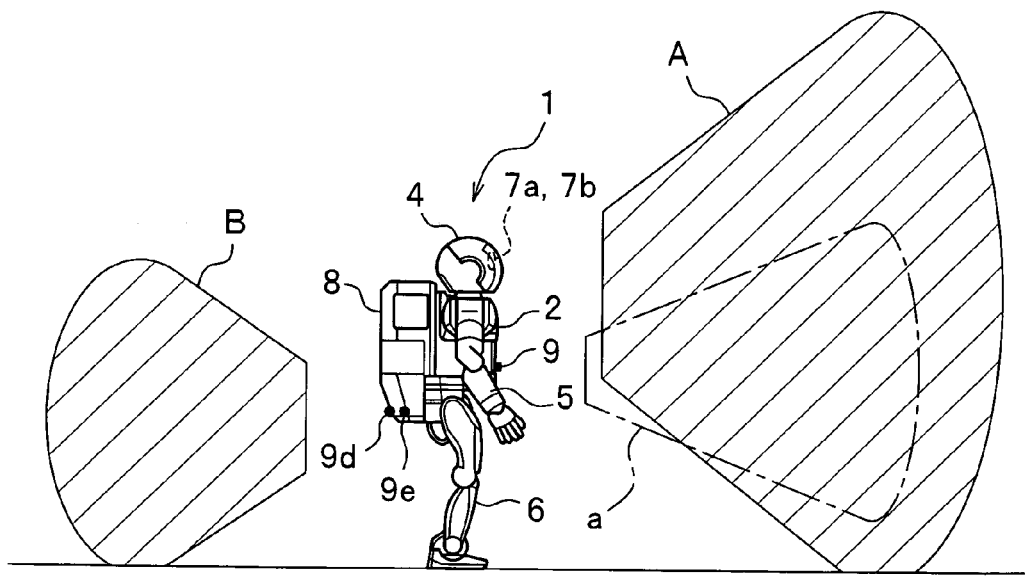
FIG. 2B is a side view of FIG. 2A.
Figure 3:
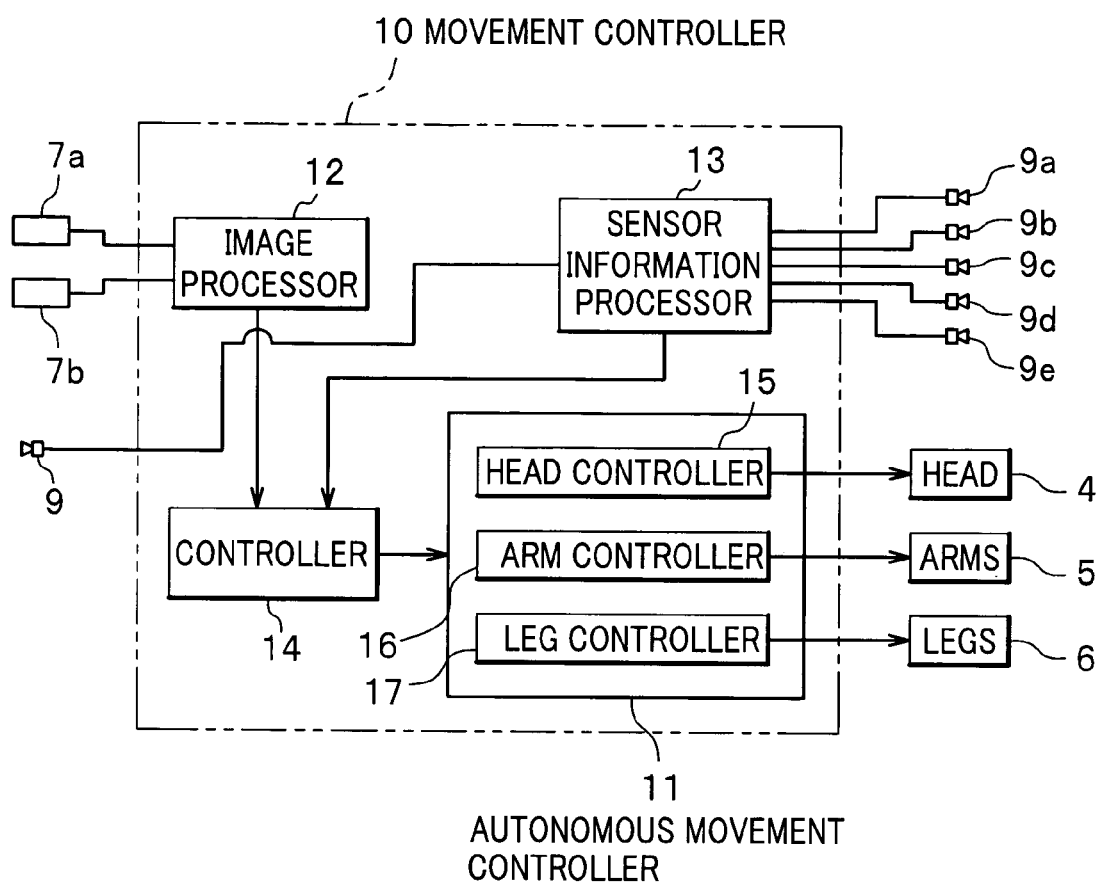
FIG. 3 is a block diagram showing configuration of a movement controller of the robot according to the present embodiment.

Hereafter, the present invention is described in reference to an embodiment shown in the accompanying drawings. FIG. 1 is a front view showing an autonomous mobile bipedal robot (hereafter, referred as a robot) as an autonomous mobile robot according to the embodiment of the present invention. FIG. 2A and FIG. 2B are respectively a top plan view and a side view of the robot. FIG. 3 is a block diagram showing configuration of a movement controller of the robot.

[Configuration of Robot]

As shown in FIGS. 1, 2A, and 2B, a robot 1 according to the present embodiment includes a head 4 connected to a top of a body 2 through a neck 3. The robot 1 has two arms 5 on upper portions of both sides of the body 2 and two legs 6 under the body 2. The body 2, the neck 3, the head 4, and the arms 5 are included to an upper body.

Each of joints of the head 4 (the neck 3), the arms 5, and the legs 6 which substantially correspond to joints of a man, can be operated by an actuator (not shown). An autonomous movement controller 11 (see FIG. 3) controls movement of the head 4, the arms 5, and the legs 6.

Two CCD cameras 7a and 7b (stereo cameras), which are first detectors, are arranged in left and right on a frontside 4a of the head 4 of the robot 1 keeping a predetermined space between the CCD cameras. In addition, an ultrasonic sensor 9 is placed on a lower portion of the frontside of the body 2. Moreover, a plurality of (five in the present embodiment) ultrasonic sensors 9a, 9b, 9c, 9d, and 9e, which are second detectors, are arranged in a horizontal row on a lower portion of a housing section 8 attached to a backside of the body 2 along periphery of a backside of the housing section 8 from rear portions of both sides of the housing section 8 keeping a predetermined space between adjacent ultrasonic sensors. Here, the frontside 4a of the head 4 is formed of visible light transparent material.

The two CCD cameras 7a and 7b are cameras which shoot images in a front region of the robot 1. Information of images shot by each of the CCD cameras 7a and 7b is processed by an image processor 12 (See FIG. 3). As shown in FIGS. 2A and 2B, in the present embodiment, a shooting range A (a sensing region) (shaded portion) of the CCD cameras 7a and 7b is a range within several meters from front of the robot 1 with a horizontal and vertical coverage of about 40-60 degrees when the robot 1 stands with the head 4 facing forward. Thus, the CCD cameras 7a and 7b can detect distance to and position of an object (an obstacle or a mobile object) in the shooting range A. By the way, the shooting range A of the CCD cameras 7a and 7b moves as the head 4 moves when an actuator (not shown) for the neck drives the head 4 to move vertically and horizontally within predetermined angular ranges.

Moreover, the ultrasonic sensor 9 attached to the lower portion of the frontside of the body 2 is a sensor which detects an object (an obstacle or a mobile object) in the front region of the robot 1. A sensor information processor 13 (See FIG. 3) detects whether there is an object (an obstacle or a mobile object) in a sensing range a (a sensing region) (see FIGS. 2A and 2B) where ultrasonic waves reach. In the present embodiment, the sensing range a (an inside region surrounded by an alternate long and short dashed line) of the ultrasonic sensor 9 is a range horizontally within approximate width of shoulders of the robot 1 with a vertical directional coverage of about 30 degrees when the robot 1 stands facing forward. Thus, the ultrasonic sensor 9 can certainly detect an object to be detected (an object) even when the object to be detected is a glass window, or the like which is substantially transparent.

The ultrasonic sensor 9 is an example of "second ultrasonic sensor" in the claims.

The five ultrasonic sensors 9a-9e (see FIG. 2A) arranged on the lower portion of the housing section 8 are sensors which detect an object (an obstacle or a mobile object) in a rear region of a backside of the body 2 (a rear region, a rear right region, and a rear left region of the upper body) of the robot 1. The sensor information processor 13 (see FIG. 3) determines whether there is an object (an obstacle or a mobile object) in an entire sensing range B (See FIG. 2A and FIG. 2B) where supersonic waves reach.

As shown in FIGS. 2A and 2B, in the present embodiment, the entire sensing range B (shaded portion) of the ultrasonic sensors 9a-9e is a horizontal substantially semicircle region in the rear region of the backside of the body 2 of the robot 1 with a vertical directional coverage of about 40-60 degrees when the robot 1 stands facing forward. Here, the shooting range A of the CCD cameras 7a and 7b is taken into consideration. In other words, the ultrasonic sensors 9a-9e are arranged so as to detect an object in a horizontal substantially semicircle region (a rear substantially semicircle region of a horizontal circle with a diameter in a plane which includes a backside of the body 2 of the robot 1 as divided by the diameter) behind the body 2 of the robot 1 (the rear region, the rear right region, and the rear left region of the upper body of the robot 1). Each of the ultrasonic sensors 9a-9e employed in the present embodiment has a horizontal directional coverage of about 40 degrees. The sensing ranges of the ultrasonic sensors 9a-9e overlap a little each other in order to cover the entire sensing range B without oversight. Meanwhile, each of the ultrasonic sensors 9a-9e can certainly detect an object to be detected (an object) even when the object to be detected is a glass window, or the like which is substantially transparent.

Among the ultrasonic sensors 9a-9e, the ultrasonic sensors 9a and 9e placed on the both sides of the robot 1 are sensors which detect an object (an obstacle or a mobile object) in a region a little backward from the exact left and right of the robot 1. In addition, the ultrasonic sensor 9c placed at the center is a sensor which detects an object (an obstacle or a mobile object) in a region just behind the robot 1. Moreover, the ultrasonic sensors 9b and 9d respectively located between the ultrasonic sensors 9a and 9c and the ultrasonic sensors 9e and 9c are sensors which detect an object (an obstacle or a mobile object) in a rear left and right regions of the ultrasonic sensors 9b and 9d. In FIG. 2A, sensing ranges B1, B2, B3, B4, and B5 shows respectively sensing ranges of the ultrasonic sensors 9a, 9b, 9c, 9d, and 9e.

[Movement Controller of Robot]

FIG. 3 is a block diagram showing configuration of a movement controller 10 of the robot 1. As shown in FIG. 3, the movement controller 10 has the autonomous movement controller 11 which controls movement of the head 4 (the neck 3), the arms 5, and the legs 6, an image processor 12 which processes image information input from the CCD cameras 7a and 7b, a sensor information processor 13 which processes sensor information input from the ultrasonic sensor 9 on the frontside and the ultrasonic sensors 9a-9e on the backside, and a controller 14 which controls the autonomous movement controller 11 based on information input from the image processor 12 and the sensor information processor 13. The movement controller 10 and a power-supply unit (not shown) are placed inside the housing section 8 attached to the backside of the body 2.

The autonomous movement controller 11 has a head controller 15, an arm controller 16, and a leg controller 17.

The head controller 15 controls the actuator (not shown in FIG. 5) for the neck 3 based on control signals from the controller 14 to drive the head 4 in vertical and horizontal directions within predetermined angular ranges. Thus, the head controller 15 can control the head 4 to shake in the vertical and horizontal directions. The arm controller 16 controls actuators (not shown in FIG. 5) for the arms 5 based on control signals from the controller 14 to drive each of joints (shoulder joints, elbow joints, wrist joints, and knuckles) of the arms 5. So, the arm controller 16 can control the arm 5 to move back and forth, right and left, and up and down, a wrist 5a to rotate, and thumbs and fingers 5b to grasp.

Moreover, the leg controller 17 controls actuators (not shown in FIG. 5) for the legs 6 based on control signals from the controller 14 to drive each of joints (hip joints, knee joints, and ankle joints) of the legs 6. Thus, the leg controller 17 can control to drive the two legs 6 in order that the robot 1 can move (walk) forward and backward and turn. In addition, the leg controller 17 can control the hip joints of the legs 6 to drive the body 2 to rotate by a predetermined angle relative to the legs 6 about a vertical axis.

The image processor 12 calculates distance to and position of an object (an obstacle or a mobile object) in the shooting range A (the shaded portion) based on the image information input from the CCD cameras 7a and 7b in order to detect (recognize) the object (the obstacle or the mobile object) in the shooting range A (the shaded portion).

The sensor information (received signals) is input from each of the ultrasonic sensor 9 and the ultrasonic sensors 9a-9e to the sensor information processor 13. Then, the sensor information processor 13 detects whether there is an object (an obstacle or a mobile object) in the sensing ranges a and B (one or more of the sensing ranges B1, B2, B3, B4, and B5). For instance, as shown in FIG. 4B, there is an object (a man M as a mobile object in FIG. 4B) in the sensing range B3 of the ultrasonic sensor 9c in the region just behind the robot 1 when the sensor information is input only from the ultrasonic sensor 9c to the sensor information processor 13.

Moreover, the sensor information processor 13 ignores the input sensor information when a reflected wave comes from inside of a range where the arms 5 of the robot 1 can move (that is, when time elapsed to receive a reflected wave is shorter than a predetermined threshold). Accordingly, it is possible to prevent the ultrasonic sensor 9a from mistakenly detecting the arm 5 as an obstacle in a case where the arm 5 is positioned in a backward direction, for instance.

[Movement of Robot when Object (Obstacle or Mobile Object (Man)) is Detected]

Figure 4A:
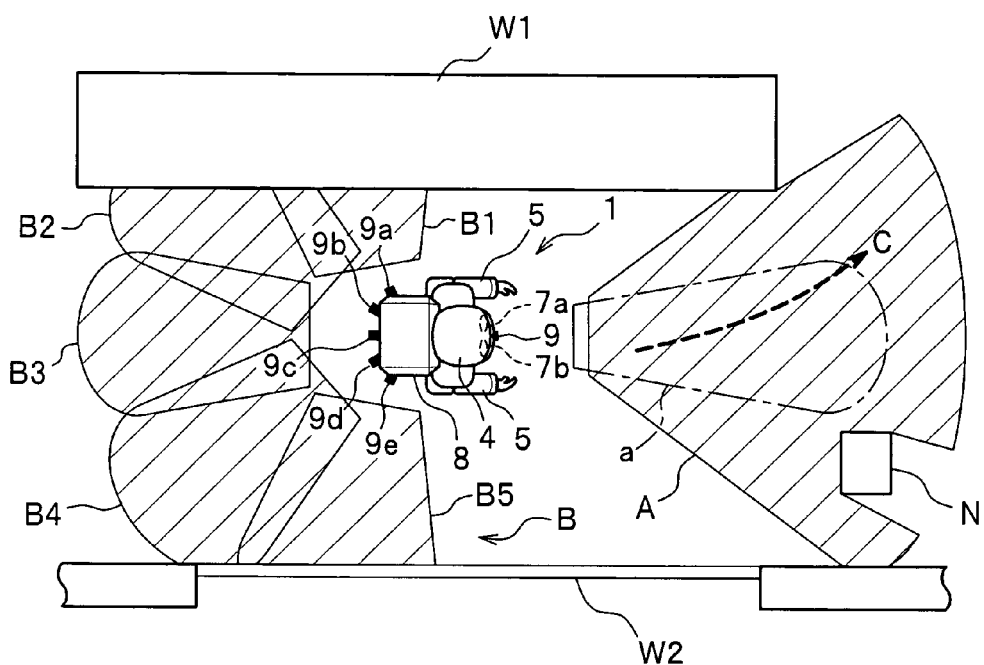
FIG. 4A is a top plan view showing a state where there is an object (an obstacle) in the shooting range of the CCD cameras arranged on the frontside of the robot.
Figure 4B:
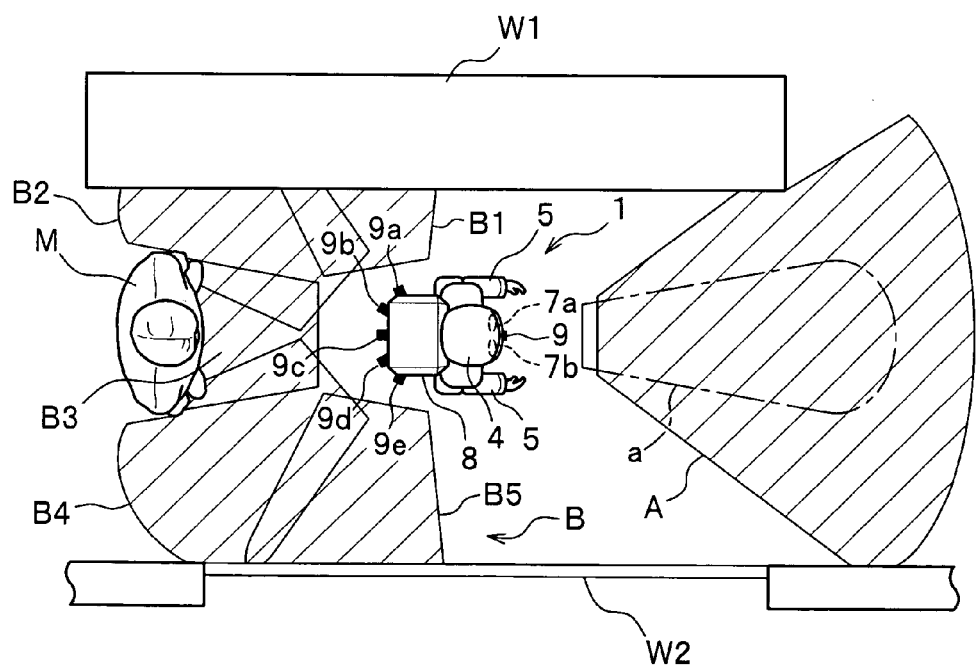
FIG. 4B is a top plan view showing a state where there is an object (a man) in the sensing ranges of ultrasonic sensors arranged on the backside of the robot.

For instance, as shown in FIG. 4A, when each of the CCD cameras 7a and 7b detects an object (an obstacle N such as a pillar shown in FIG. 4A) in the front region (right side in FIG. 4A) of the robot 1, the controller 14 outputs a control signal to the leg controller 17 of the autonomous movement controller 11 based on information (information of position and distance) about the object (the obstacle N) input from the image processor 12. The control signal is a signal to let the robot 1 move around the object (the obstacle N) to avoid collision with the object. Thus, the controller 14 drives the two legs 6 in order to let the robot 1 turn in a direction indicated by an arrow C to avoid the object. By the way, in this case, the robot 1 may be controlled to stop moving forward instead of to turn in the direction indicated by the arrow C. Here, in FIG. 4A, W1 shows a wall as an object (an obstacle) while W2 shows a glass window as an object (an obstacle).

Moreover, in a situation shown in FIG. 4A, the ultrasonic sensor 9 provided on the frontside also detects an object (an obstacle or a mobile object) in the sensing range a in the front region of the robot 1. Accordingly, even when there is an obstacle such as a glass window, which the CCD cameras 7a and 7b cannot certainly detect, the ultrasonic sensor 9 can certainly detect the obstacle. In this case also, the controller 14 may output a stop signal (a control signal) to the leg controller 17 of the autonomous movement controller 11 in order to let the robot 1 stop moving forward instead of letting the robot 1 move around the obstacle.

In addition, in the situation shown in the FIG. 4A, each of the ultrasonic sensors 9a-9e provided on the backside detects an object (an obstacle or a mobile object) in the rear region of the backside of the body 2 of the robot 1 at the same time. Therefore, for instance, even when an object (for instance, a man) is approaching from the rear side of the robot 1, the ultrasonic sensors 9a-9e can also detect the object simultaneously. In this case, the robot 1 may be controlled to stop moving forward.

Moreover, as shown in the FIG. 4B, for instance, when the robot 1 moves backward (moves to the left in FIG. 4B), the ultrasonic sensors 9a and 9b detect an object (the wall W1 as an obstacle in FIG. 4B) on one side of the robot 1. In addition, the ultrasonic sensors 9d and 9e detect an object (the glass window W2 as an obstacle in FIG. 4B) on the other side of the robot 1. Thus, if the controller 14 determines that the robot 1 can safely move backward between the wall W1 and the glass window W2 based on the information input from the sensor information processor 13, the controller 14 outputs a control signal to the leg controller 17 of the autonomous movement controller 11 to drive the two legs 6 in order to let the robot 1 move backward.

Additionally, in this case, if the controller 14 determines that the robot 1 cannot safely move backward through space between the wall W1 and the glass window W2 based on the information input from the sensor information processor 13, the controller 14 outputs a stop signal to the leg controller 17 of the autonomous movement controller 11 in order to let the robot 1 stop moving backward.

In addition, in a situation shown in the FIG. 4B, when the ultrasonic sensor 9c detects an object (a man M as an approaching mobile object in FIG. 4B) in a region just behind the robot 1 in the backward direction, the controller 14 determines that there is an object (the man M in FIG. 4B) just behind the robot 1 based on the information input from the sensor information processor 13. Then the controller 14 outputs a stop signal to the leg controller 17 of the autonomous movement controller 11 in order to let the robot 1 stop moving backward.

As described above, in the robot 1 according to the present embodiment, the five ultrasonic sensors 9a-9e are arranged on the lower portion of the housing section 8 attached to the backside of the body 2 keeping a predetermined space between the adjacent ultrasonic sensors. Therefore, even when there is a glass window or an approaching man as an object in the rear region of the backside of the body 2 of the robot 1, the robot 1 can certainly detect the glass window or the approaching man. As a result, in moving backward, even when there is an object (an obstacle or a mobile object) in the rear region of the backside of the body 2 of the robot 1, the robot 1 can certainly move properly depending on the object.

By the way, in the robot 1 according to the present embodiment, the five ultrasonic sensors 9a-9e are arranged along the periphery of the housing section 8 attached to the backside of the body 2 keeping a predetermined space between the adjacent sensors. However, as described above, the hip joints of the legs 6 can be driven so as to cause the body 2 to rotate by a predetermined angle relative to the legs 6 about a vertical axis. Therefore, only one to three ultrasonic sensors may be arranged along the periphery of the housing section 8 to detect an object (an obstacle or a mobile object) in the rear region of the backside of the body 2 of the robot 1. In this case, the fewer number of the ultrasonic sensors results in lower cost.

[Driving Structure of Robot 1]

Figure 5:
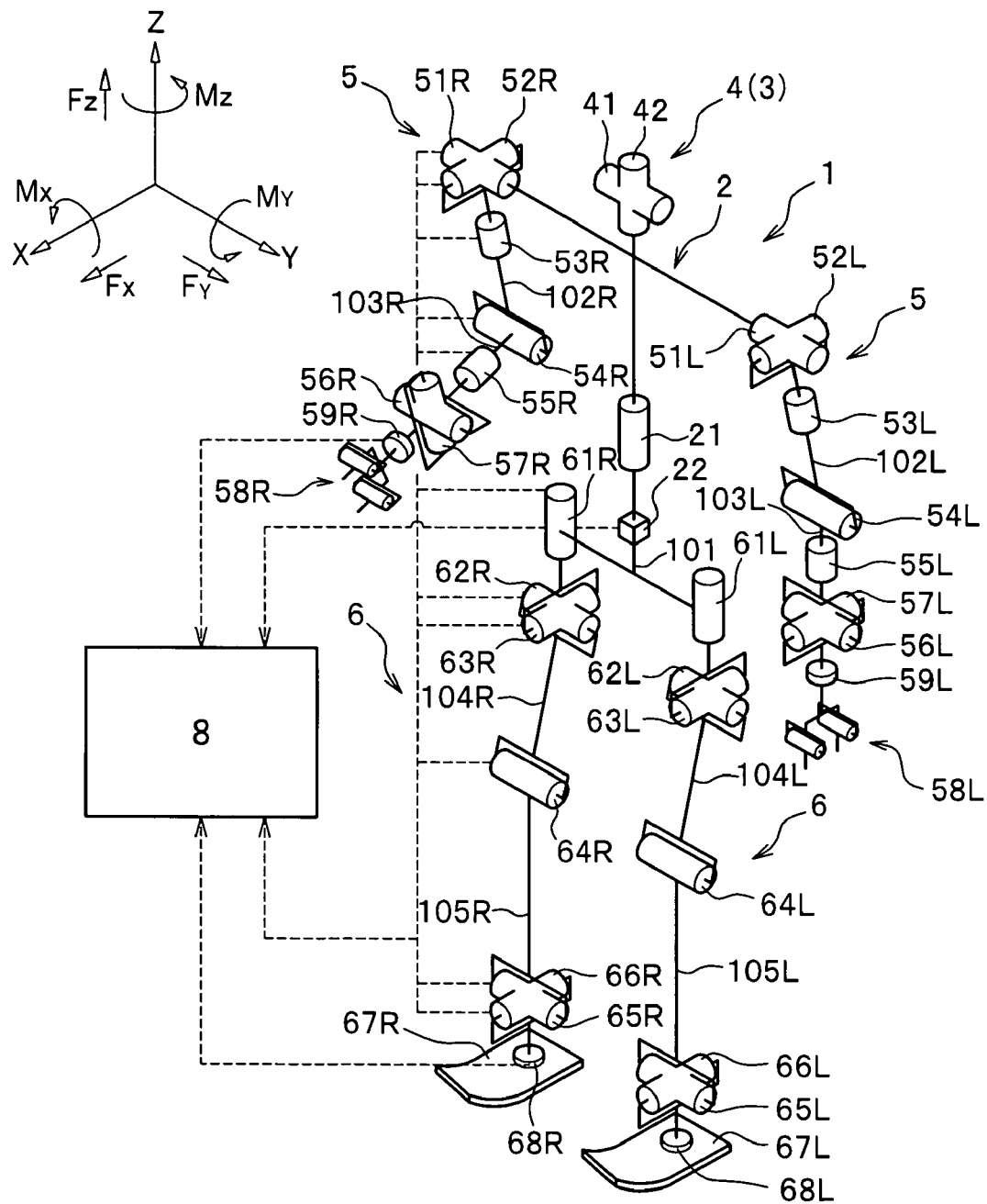
FIG. 5 is a perspective view showing driving structure of the robot in FIG. 1 schematically.

Next, driving structure of the robot 1 is described in more detail. FIG. 5 is a perspective view which shows the driving structure of the robot in FIG. 1 schematically. In FIG. 5, each of joints is shown by an electric motor (an actuator) which drives the joint.

<Body 2>

As shown in FIG. 5, the body 2, which is a base body of the robot 1, is connected with the legs 6, the arms 5, and the head 4. In other words, the body 2 (an upper body link 101) is connected with the legs 6 through hip joints 61R(L)-63R(L) (Hereafter, joints on the right and left are respectively indicated by R and L.). In addition, the body 2 is connected with the arms 5 through shoulder joints 51R(L)-53R(L), which will be described later. Moreover, the body 2 is connected with the head 4 through neck joints 41 and 42, which will be described later.

Additionally, the body 2 includes a joint 21 for rotating the upper body (about Z axis).

<Head 4>

As shown in FIG. 5, the head 4 includes the neck joint 41 for rotating the neck 3 (a joint portion between the head 4 and the body 2) about Y axis and the neck joint 42 for rotating the neck 3 about Z axis. The neck joints 41 and 42 are respectively driven to adjust directions of tilt and pan of the head 4.

<Arm 5>

As shown in FIG. 5, each of the right and left arms 5 includes seven joints 51R(L)-57R(L). The fourteen right and left joints include the shoulder joints 51R and 51L for rotating shoulders (joint portions between the arms 5 and the body 2) about a pitch axis (Y axis), the shoulder joints 52R and 52L for rotating the shoulders about a roll axis (X axis), the shoulder joints 53R and 53L for rotating the arms 5 (about Z axis), elbow joints 54R and 54L for rotating elbows about a pitch axis (Y axis), arm joints 55R and 55L for rotating wrists (about Z axis), wrist joints 56R and 56L for rotating the wrists about a pitch axis (Y axis), and wrist joints 57R and 57L for rotating the wrists about a roll axis (X axis). In addition, hands 58R and 58L having thumbs 5b and 5b (see FIG. 1) are attached to ends of the arms 5.

In other words, the arms 5 include the shoulder joints 51R(L), 52R(L), and 53R(L), the elbow joints 54R(L), the arm joints 55R(L), and the wrist joints 56R(L) and 57R(L). The shoulder joints 51R(L)-53R(L) are connected with the elbow joint 54R(L) through an upper arm link 102R(L). The elbow joints 54R(L) are connected with the wrist joints 56R(L) and 57R(L) through a forearm link 103R(L).

In such a configuration, the right and left arms 5 have fourteen degrees of freedom in total. The fourteen joints 51R(L)-57R(L) are driven to rotate by proper angles so as to cause the robot 1 to move as desired <Leg 6>

As shown in FIG. 5, each of the right and left legs 6 includes six joints 61R(L)-66R(L). The twelve right and left joints include hip joints 61R and 61L for rotating the legs 6 in crotch portions (joint portions between the legs 6 and the body 2) (about Z axis), hip joints 62R and 62L for rotating thighs about a pitch axis (Y axis), hip joints 63R and 63L for rotating the thighs about a roll axis (X axis), knee joints 64R and 64L for rotating knees about a pitch axis (Y axis), ankle joints 65R and 65L for rotating ankles about a pitch axis (Y axis), and ankle joints 66R and 66L for rotating the ankles about a roll axis (X axis). In addition, foot portions 67R and 67L are attached under the legs 6.

In other words, the legs 6 include hip joints 61R(L), 62R(L), and 63R(L), knee joints 64R(L), and ankle joints 65R(L) and 66R(L). The hip joints 61R(L)-63R(L) are connected with the knee joints 64R(L) through thigh links 104R(L). The knee joints 64R(L) are connected with the ankle joints 65R(L) and 66R(L) through curs links 105R(L).

In such a configuration, the right and left legs 6 have twelve degrees of freedom in total. The twelve joints 61R(L)-66R(L) are driven to rotate by proper angles so as to cause the legs 6 to move as desired while the robot 1 is moving. Accordingly, the robot 1 can move arbitrarily and three-dimensionally.

For instance, the robot 1 can move forward by alternately driving the legs 6 forward. Additionally, the robot 1 can move backward by alternately driving the legs 6 backward. Moreover, the robot 1 drives one leg 6 horizontally so as to open the legs 6 and then the other leg 6 to follow the first one so as to close the legs 6. Thus, the robot 1 can move right and left by repeating this movement, so-called, side step.

In addition, an inclination sensor 22 is provided in the body 2. The inclination sensor 22 detects an angle between the body 2 and a gravity axis (Z axis) and angular velocity of the body 2.

Moreover, well-known six-axial force sensors 59R(L) are provided between the wrist joints 56R(L) and 57R(L), and the hands 58R(L). The six-axial force sensors 59R(L) detect three direction components Fx, Fy and Fz of reaction force and three direction components Mx, My, and Mz of moment applied on the hands 58R(L) of the robot 1.

In addition, well-known six-axial force sensors 68R(L) are provided between the ankle joints 65R(L) and 66R(L), and the foot portions 67R(L). The six-axial force sensors 68R(L) detect three direction components Fx, Fy and Fz of floor reaction force and three direction components Mx, My, and Mz of moment applied to the robot 1 from a floor.

Furthermore, the electric motor of each joint changes relative position of the thigh link 104R(L), the curs link 105 R(L), or the like link through a decelerator (not shown) which reduces speed and increases power output from the electric motor. Angle of each joint is detected by a joint angle detector (for instance, a rotary encoder).

<Housing Section 8>

The housing section 8 contains the autonomous movement controller 11, the controller 14, and a battery (not shown), and so on (see FIG. 3). Data detected by a sensor such as 22, 59R(L), and 68R(L) are sent to the controller 14 in the housing section 8. Then, the controller 14 sends a control signal to the autonomous movement controller 11 based on the detected data. Moreover, the electric motor of each joint is driven by a drive instruction signal sent from the autonomous movement controller 11.

A portion including the body 2 and the housing section 8 is an example of "body unit" in the claims. In addition, a portion including the body 2, the neck 3, the head 4, the arms 5, the hands 58R and 58L, and the housing section 8 is an example of "upper body" in the claims.

The autonomous movement controller 11 (the head controller 15) drives the neck joint 42 so as to rotate the head 4 relative to the body 2 about a vertical axis. Thus, the robot 1 can turn the shooting range A of the CCD cameras 7a and 7b in a desired direction (see FIGS. 2 and 3 as needed).

Moreover, the autonomous movement controller 11 drives the joint 21 so as to rotate the body 2 relative to the legs 6 about a vertical axis. In addition, the autonomous movement controller 11 (the head controller 15) drives the neck joint 42 so as to rotate the head 4 relative to the body 2 about a vertical axis. Accordingly, the robot 1 can change the shooting range A of the CCD cameras 7a and 7b and the sensing ranges a and B1-B5 of the ultrasonic sensors 9 and 9a-9e in a desired direction.

[Detection of Object in Front Region]

Next, how the robot 1 detects an object in the front region is described.

Figure 6:
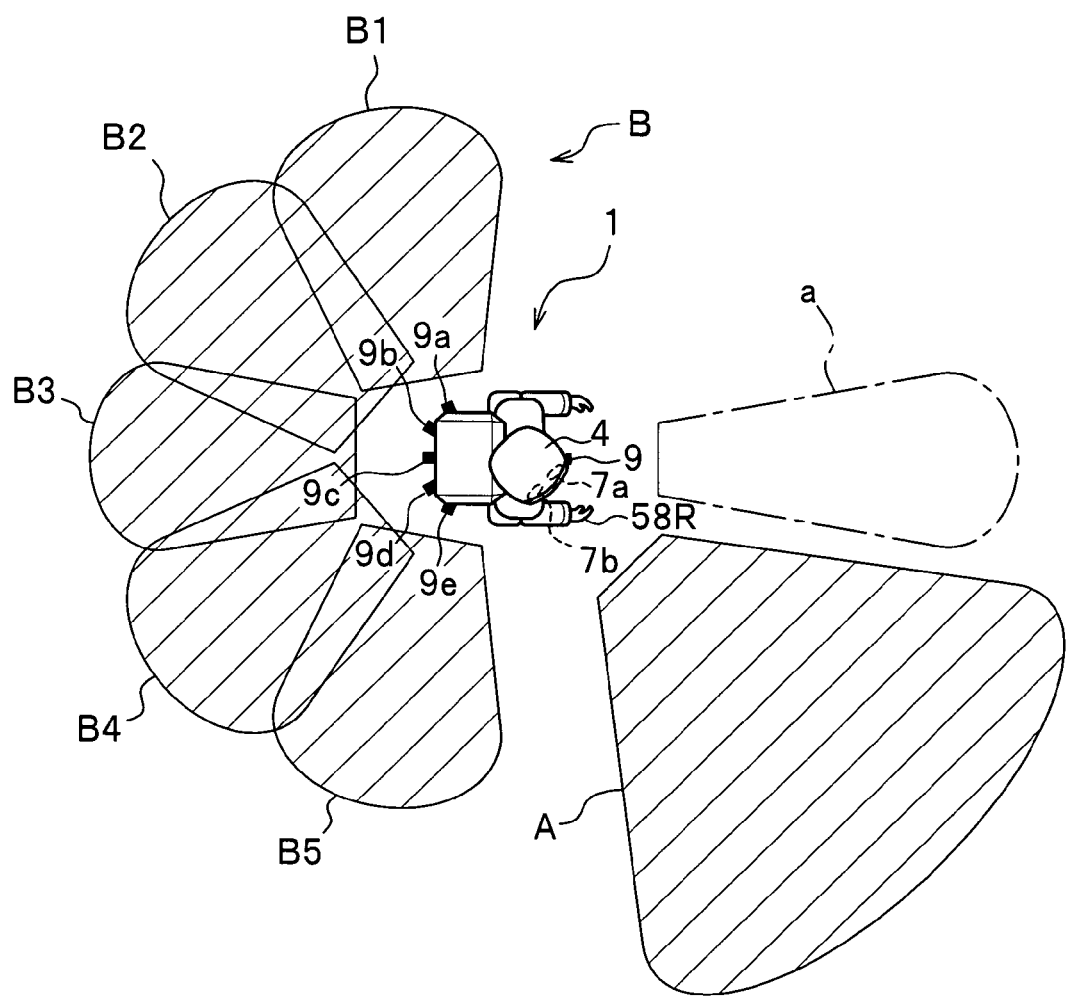
FIG. 6 is a drawing showing a robot with a head facing forward right.

FIG. 6 is a drawing which shows the robot 1 with the head facing forward right. As shown in FIG. 6, the head controller 15 drives the neck joint 42 so as to rotate the head 4 relative to the body 2. Therefore, the robot 1 can detect an object in the front region by the ultrasonic sensor 9 even when the CCD cameras 7a and 7b turns in a direction (the forward right direction in FIG. 6) other than forward.

[Movement of Swinging Arms on Moving Forward and Backward]

Next, movement of swinging the arms when the robot 1 moves forward and backward is described (see FIGS. 1-5 as needed).

Figure 7A:
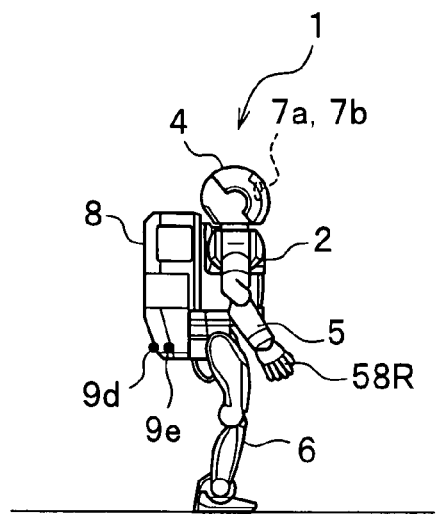
FIG. 7A is a side view of a robot which swings an arm to the most forward position to illustrate movement of swinging arms when the robot moves forward and backward.
Figure 7B:
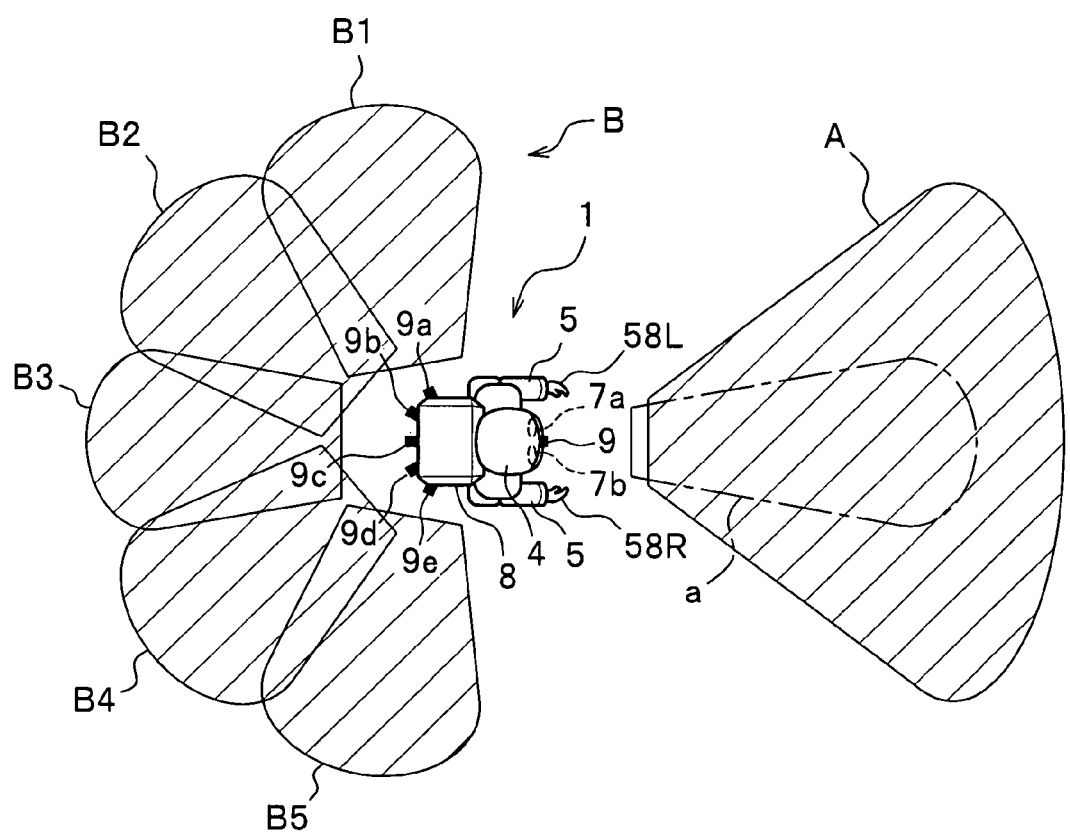
FIG. 7B is a top plan view of a robot which swings an arm to the most forward position to illustrate movement of swinging arms when the robot moves forward and backward.
Figure 8A:
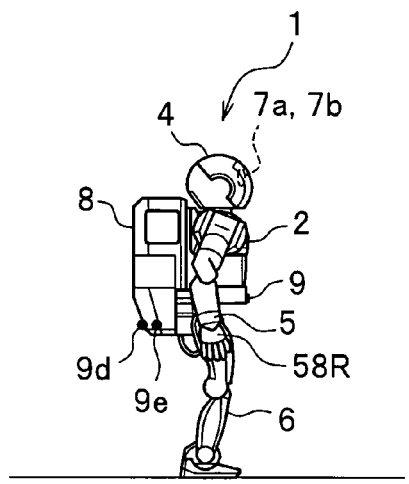
FIG. 8A is a side view of a robot which swings an arm to the most backward position to illustrate movement of swinging arms when the robot moves forward and backward.
Figure 8B:
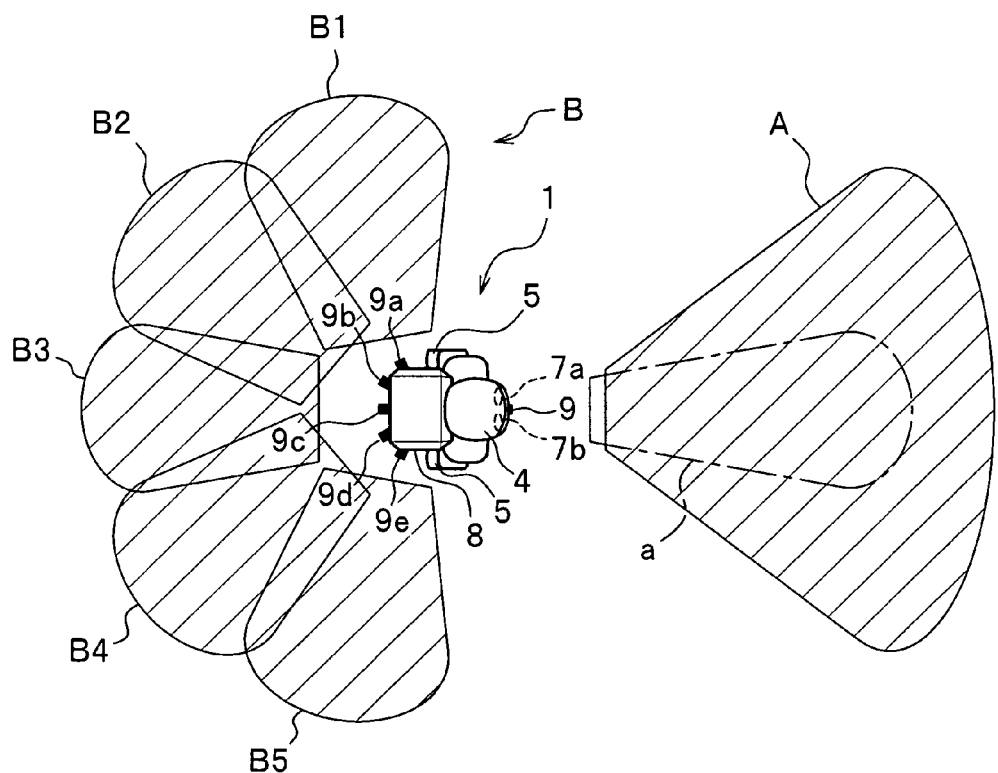
FIG. 8B is a top plan view of a robot which swings an arm to the most backward position to illustrate movement of swinging arms when the robot moves forward and backward.

FIGS. 7A and 7B are drawings which show movement of swinging the arms when the robot 1 moves forward and backward. FIG. 7A is a side view of the robot 1 which swings the arm to the most forward position. FIG. 7B is a top plan view of the robot 1 which swings the arm to the most forward position. FIGS. 8A and 8B are drawings which show movement of swinging the arm when the robot 1 moves forward and backward. FIG. 8A is a side view of the robot 1 which swings the arm to the most backward position. FIG. 8B is a top plan view of the robot 1 which swings the arm to the most backward position.

The leg controller 17 drives each joint of the legs 6 so as to cause the robot 1 to move forward and backward. At this time, the arm controller 16 drives each joint of the arms 5 so as to cause the robot 1 to swing the arms 5 and the hands 58R and 58L within a range shown in FIGS. 7 and 8. In other words, the arm controller 16 controls the arms 5 and the hands 58R and 58L to swing outside the sensing ranges a and B1-B5 of the ultrasonic sensors 9 and 9a-9e. Therefore, the arms 5 and the hands 58R and 58L do not come into the sensing ranges a and B1-B5 of the ultrasonic sensors 9 and 9a-9e. Consequently, the robot 1 can detect an object using the ultrasonic sensors 9 and 9a-9e without being obstructed by movement of the arms 5 and the hands 58R and 58L when the robot 1 moves forward and backward.

[Relationship Between Position of Arms and Hands and Detection by Ultrasonic Sensors]

Next, relationship between position of the arms 5 and the hands 58R and 58L, and detection by the ultrasonic sensors 9 and 9a-9e is described.

The FIG. 9A is a front view of an example of a robot which is gesturing. The FIG. 9B is a side view of an example of a robot which is gesturing.

As shown in FIGS. 9A and 9B, the arm 5 or 5 or the hand 58R or 58L might be positioned in the sensing ranges a and B1-B5 of the ultrasonic sensors 9 and 9a-9e while the robot 1 is gesturing. In the case of FIGS. 9A and 9B, it is possible to detect an object in a lower sensing range a1 in the sensing range a of the ultrasonic sensor 9. However, it is not possible to certainly detect an object since the hand 58R or 58L is positioned in an upper sensing range a2.

In such a case, the controller 14 of the robot 1 determines whether an arm 5 or a hand 58R or 58L is positioned in the sensing ranges a and B1-B5 of the ultrasonic sensors 9 and 9a-9e based on pre-memorized setting positions of the ultrasonic sensors 9 and 9a-9e and sizes of the sensing ranges a and B1-B5, lengths of each link, and drive states of the arms 5 by the arm controller 16. Then, if the controller 14 determines that an arm 5 or a hand 58R or 58L is positioned in the sensing ranges a and B1-B5, the controller 14 stops a corresponding ultrasonic sensor (here, the ultrasonic sensor 9) detecting an object, through the sensor information processor 13.

Moreover, if the controller 14 of the robot 1 determines that the arms 5 and the hands 58R and 58L have gone out of the sensing ranges a and B1-B5, the controller 14 restarts the corresponding ultrasonic sensor (here, the ultrasonic sensor 9) detecting an object, through the sensor information processor 13.

Therefore, when the ultrasonic sensors 9 and 9a-9e cannot certainly detect an object, the robot 1 can stop detection by the ultrasonic sensors 9 and 9a-9e so as to reduce load of data processing.

[Detection of Object on Moving Right and Left]

Here, how the robot 1 detects an object when the robot 1 moves right and left is described.

FIGS. 10A and 10B are drawings which show detection of an object when a robot moves right and left. The FIG. 10A is a top plan view. And, FIG. 10B is a front view.

As shown in FIGS. 10A and 10B, the leg controller 17 drives each of the joints of the legs 6, especially the hip joints 63R and 63L, so as to cause the robot 1 to move to the right. At this time, the head controller 15 drives the neck joint 42 so as to cause the robot 1 to rotate the head 4 relative to the body 2. Accordingly, the CCD cameras 7a and 7b are turned in a moving direction, that is, to the right. After that, the robot 1 moves to the right while shooting images in the moving direction with the CCD cameras 7a and 7b. In the case where the robot 1 moves to the left, the robot 1 performs similarly. In this case, the robot 1 may stop the ultrasonic sensors 9 and 9a-9e detecting an object.

Therefore, the robot 1 can detect an object (shoot images) in the moving direction even when the robot 1 moves right and left.

In addition, as shown in FIG. 4, the robot 1 shoots images with CCD cameras 7a and 7b and detects an object with the ultrasonic sensors 9 and 9a-9e when the robot 1 moves forward and backward.

Accordingly, the robot 1 can detect an object (shoot images) in response to movement of the robot 1.

[Detection of Transparent Object]

Next, how the robot 1 detects a transparent object is described.

FIG. 11A is a top plan view which shows a state where an object (a wall) in the shooting range of the CCD cameras and the sensing range of the ultrasonic sensor arranged on the frontside of the robot. FIG. 11B is a top plan view which shows a state where there is an object (a glass window) in the shooting range of the CCD cameras and the sensing range of the ultrasonic sensor arranged on the frontside of the robot.

As shown in FIG. 11A, when there is a wall W3 (not transparent) in the front region of the robot 1, the robot 1 shoots images of and detects the wall W3 by the CCD cameras 7a and 7b and detects the wall W3 by the ultrasonic sensor 9.

However, as shown in FIG. 11B, when there is a glass window W4 (transparent) in the front region of the robot 1, the robot 1 detects the glass window W4 by the ultrasonic sensor 9, but the robot 1 cannot certainly detect the glass window W4 by the CCD camera 7a or 7b.

The controller 14 calculates relative position of an object shot by the CCD camera 7a or 7b with respect to the robot 1 based on image data of images shot by the CCD camera 7a or 7b sent from the image processor 12 and drive states of the joints by the autonomous movement controller 11.

Moreover, the controller 14 calculates relative position of an object detected by one of the ultrasonic sensors 9 and 9a-9e with respect to the robot 1 based on data detected by the one of the ultrasonic sensors 9 and 9a-9e sent from the sensor information processor 13 and drive states of the joints by the autonomous movement controller 11.

Then, the controller 14 determines whether the object shot by the CCD camera 7a or 7b is identical to the object detected by the one of the ultrasonic sensors 9 and 9a-9e based on the calculated position of the objects.

Accordingly, the controller 14 of the robot 1 recognizes the object (the glass window W4) which is detected by one of the ultrasonic sensors 9 and 9a-9e but not detected by the CCD camera 7a or 7b which shoots images in the same region with the one of the ultrasonic sensors 9 and 9a-9e, is a transparent object.

Therefore, the robot 1 can recognize ambient environment more precisely using difference between results shot by the CCD cameras 7a and 7b and results detected by the ultrasonic sensors 9 and 9a-9e.

While the described embodiments represent the preferred forms of the present invention, it is to be distinctly understood that the invention is not limited thereto but may be otherwise variously embodied within the spirit and scope of the following claims.

What is claimed is:

1. An autonomous mobile robot which is autonomously movable forward or backward, comprising:
   an upper body;
   legs connected under the upper body;
   a first detector which detects an object in a front region of the upper body in a moving direction of the robot; and
   a second detector which detects an object in a region other than the front region of the upper body sensed by the first detector, wherein the region other than the front region sensed by the first detector includes at least a rear region, a rear right region, and a rear left region of the upper body, and wherein the object detected in the other region by the second detector causes the robot to perform backward walking movement towards the object or away from the object; wherein the first detector comprises a stereo camera and the second detector comprises an ultrasonic sensor; a plurality of the ultrasonic sensors are arranged along periphery of the upper body from rear portions of right and left sides of the upper body to a backside of the upper body keeping a predetermined space between adjacent ones of the plurality of ultrasonic sensors; the upper body comprises a body unit which is rotatable relative to the legs about a vertical axis, and a head which is rotatable relative to the body unit about a vertical axis, wherein the plurality of ultrasonic sensors are provided in the body unit, and wherein the stereo camera is provided in the head; a second ultrasonic sensor which is provided in the body unit to detect an object in the front region of the body unit in the moving direction of the robot; a controller which, when a sensing region of the stereo camera is overlapped with at least one of the sensing regions of the plurality of ultrasonic sensors and the second ultrasonic sensor, recognizes that an object which is in the overlapped sensing region, and not detected by the stereo camera but detected by one of the plurality of ultrasonic sensors and the second ultrasonic sensor corresponding to the at least one of the sensing regions with which the sensing region of the stereo camera is overlapped, is transparent.

2. An autonomous mobile robot according to claim 1, wherein the upper body is rotatable relative to the legs about a vertical axis.

3. An autonomous mobile robot according to claim 1, comprising:
   a pair of arms provided on right and left sides of the body unit;
   a pair of hands respectively provided at ends of the pair of arms; and
   an arm controller which drives the pair of arms and the pair of hands, wherein the arm controller controls the pair of arms and the pair of hands to swing within a region outside sensing regions of the plurality of ultrasonic sensors and the second ultrasonic sensor when the robot moves forward and backward with the legs.

4. An autonomous mobile robot according to claim 1, comprising:
   a pair of arms provided on right and left sides of the body unit; and
   a pair of hands respectively provided at ends of the pair of arms, wherein
   when at least one of the pair of arms and the pair of hands is positioned in at least one of sensing regions of the plurality of ultrasonic sensors and the second ultrasonic sensor, at least one of the plurality of ultrasonic sensors and the second ultrasonic sensor corresponding to the at least one of the sensing regions in which the at least one of the pair of arms and the hands is positioned, stops detecting an object.

5. An autonomous mobile robot according to claim 1, wherein
   the legs are movable right and left, wherein
   the stereo camera, the plurality of ultrasonic sensors, and the second ultrasonic sensor detect an object when the robot moves forward and backward with the legs, and wherein
   the head rotates relative to the body unit so as to cause the stereo camera to detect an object in the moving direction when the robot moves right and left with the legs.

6. An autonomous mobile robot according to claim 3, wherein
   when at least one of the pair of arms and the pair of hands is positioned in at least one of the sensing regions of the plurality of ultrasonic sensors and the second ultrasonic sensor, at least one of the plurality of ultrasonic sensors and the second ultrasonic sensor corresponding to the at least one of the sensing regions in which the at least one of the pair of arms and the hands is positioned, stops detecting an object.

7. An autonomous mobile robot according to claim 6, wherein
the legs are movable right and left, wherein
the stereo camera, the plurality of ultrasonic sensors, and the second ultrasonic sensor detect an object when the robot moves forward and backward with the legs, and wherein
the head rotates relative to the body unit so as to cause the stereo camera to detect an object in the moving direction when the robot moves right and left with the legs.

8. An autonomous mobile robot according to claim 7, comprising a controller which,
when a sensing region of the stereo camera is overlapped with at least one of the sensing regions of the plurality of ultrasonic sensors and the second ultrasonic sensor,
recognizes that an object which is in the overlapped sensing region, and not detected by the stereo camera but detected by one of the plurality of ultrasonic sensors and the second ultrasonic sensor corresponding to the at least one of the sensing regions with which the sensing region of the stereo camera is overlapped, is transparent.

9. An autonomous mobile robot according to claim 3, wherein
the legs are movable right and left, wherein
the stereo camera, the plurality of ultrasonic sensors, and the second ultrasonic sensor detect an object when the robot moves forward and backward with the legs, and wherein
the head rotates relative to the body unit so as to cause the stereo camera to detect an object in the moving direction when the robot moves right and left with the legs.

10. An autonomous mobile robot according to claim 9, comprising a controller which,
when a sensing region of the stereo camera is overlapped with at least one of the sensing regions of the plurality of ultrasonic sensors and the second ultrasonic sensor,
recognizes that an object which is in the overlapped sensing region, and not detected by the stereo camera but detected by one of the plurality of ultrasonic sensors and the second ultrasonic sensor corresponding to the at least one of the sensing regions with which the sensing region of the stereo camera is overlapped, is transparent.

11. An autonomous mobile robot according to claim 3, comprising a controller which,
when a sensing region of the stereo camera is overlapped with at least one of the sensing regions of the plurality of ultrasonic sensors and the second ultrasonic sensor,
recognizes that an object which is in the overlapped sensing region, and not detected by the stereo camera but detected by one of the plurality of ultrasonic sensors and the second ultrasonic sensor corresponding to the at least one of the sensing regions with which the sensing region of the stereo camera is overlapped, is transparent.

12. An autonomous mobile robot according to claim 4, wherein
the legs are movable right and left, wherein
the stereo camera, the plurality of ultrasonic sensors, and the second ultrasonic sensor detect an object when the robot moves forward and backward with the legs, and wherein
the head rotates relative to the body unit so as to cause the stereo camera to detect an object in the moving direction when the robot moves right and left with the legs.

13. An autonomous mobile robot according to claim 12, comprising a controller which,
when a sensing region of the stereo camera is overlapped with at least one of the sensing regions of the plurality of ultrasonic sensors and the second ultrasonic sensor,
recognizes that an object which is in the overlapped sensing region, and not detected by the stereo camera but detected by one of the plurality of ultrasonic sensors and the second ultrasonic sensor corresponding to the at least one of the sensing regions with which the sensing region of the stereo camera is overlapped, is transparent.

14. An autonomous mobile robot according to claim 4, comprising a controller which,
when a sensing region of the stereo camera is overlapped with at least one of the sensing regions of the plurality of ultrasonic sensors and the second ultrasonic sensor,
recognizes that an object which is in the overlapped sensing region, and not detected by the stereo camera but detected by one of the plurality of ultrasonic sensors and the second ultrasonic sensor corresponding to the at least one of the sensing regions with which the sensing region of the stereo camera is overlapped, is transparent.

15. An autonomous mobile robot according to claim 5, comprising a controller which,
when a sensing region of the stereo camera is overlapped with at least one of the sensing regions of the plurality of ultrasonic sensors and the second ultrasonic sensor,
recognizes that an object which is in the overlapped sensing region, and not detected by the stereo camera but detected by one of the plurality of ultrasonic sensors and the second ultrasonic sensor corresponding to the at least one of the sensing regions with which the sensing region of the stereo camera is overlapped, is transparent.

* * * * *